United States Patent
Ichikawa et al.

(10) Patent No.: US 7,325,308 B2
(45) Date of Patent: Feb. 5, 2008

(54) PROCESSING METHOD UTILIZING DISPLAY INFORMATION FOR CARRYING A CELL STRUCTURE WITH A CATALYTIC COMPONENT

(75) Inventors: Yukihito Ichikawa, Nagoya (JP); Eiji Ito, Yokkaichi (JP)

(73) Assignee: NGK Insulators, Ltd., Nagoya (JP)

( * ) Notice: Subject to any disclaimer, the term of this patent is extended or adjusted under 35 U.S.C. 154(b) by 500 days.

(21) Appl. No.: 10/416,299

(22) PCT Filed: Nov. 16, 2001

(86) PCT No.: PCT/JP01/09999

§ 371 (c)(1),
(2), (4) Date: May 8, 2003

(87) PCT Pub. No.: WO02/40157

PCT Pub. Date: May 23, 2002

(65) Prior Publication Data

US 2005/0100486 A1    May 12, 2005

(30) Foreign Application Priority Data

Nov. 17, 2000   (JP)   ............................. 2000-351679

(51) Int. Cl.
  *B21D 51/16*   (2006.01)
(52) U.S. Cl. .................. 29/890; 29/896.62; 29/407.05; 29/407.08; 422/179
(58) Field of Classification Search .................. 29/890, 29/508, 516, 517, 407.05, 407.08, 407.1; 422/168, 177, 179, 180; 177/245, 264
See application file for complete search history.

(56) References Cited

U.S. PATENT DOCUMENTS

| | | | | |
|---|---|---|---|---|
| 5,010,693 A | * | 4/1991 | Hatch | 451/90 |
| 5,747,096 A | * | 5/1998 | Golecki et al. | 427/8 |
| 5,755,025 A | * | 5/1998 | Wirth et al. | 29/840 |
| 5,990,197 A | | 11/1999 | Escano et al. | 523/160 |
| 6,120,832 A | * | 9/2000 | Walsh et al. | 427/8 |
| 6,393,249 B1 | * | 5/2002 | Aslam et al. | 399/333 |
| 6,622,382 B2 | * | 9/2003 | Tamura et al. | 29/890 |
| 6,948,243 B2 | * | 9/2005 | Ichikawa et al. | 29/890 |
| 2002/0076364 A1 | * | 6/2002 | Bruck | 422/177 |

FOREIGN PATENT DOCUMENTS

| | | |
|---|---|---|
| EP | 0 582 964 A2 | 2/1994 |
| EP | 0 681 095 A1 | 11/1995 |

(Continued)

*Primary Examiner*—David P. Bryant
*Assistant Examiner*—Sarang Afzali
(74) *Attorney, Agent, or Firm*—Oliff & Berridge, PLC

(57) ABSTRACT

This is directed to a processing method for carrying a cell structure (1) with a catalytic component. Information about a mass of the cell structure (1) is displayed on the surface thereof prior to the initiation of a carrying process, and in the carrying process, the information is read and the cell structure (1) is carried with an appropriate amount of the catalytic component on the basis of the information. When cell structures are processed for carrying thereon a catalytic component, each cell structure can carry an appropriate amount of the catalytic component in accordance with the mass of the cell structure, even if there is a variation in the masses of the cell structures.

10 Claims, 2 Drawing Sheets

FOREIGN PATENT DOCUMENTS

| | | | |
|---|---|---|---|
| JP | A 63-168517 | 7/1988 | |
| JP | 01150105 | * 6/1989 | ................ 385/114 |
| JP | U 2-126016 | 10/1990 | |
| JP | A 5-123237 | 5/1993 | |
| JP | A 6-154710 | 6/1994 | |
| JP | A 7-5023 | 1/1995 | |
| JP | A 7-265706 | 10/1995 | |
| JP | A 8-1280 | 1/1996 | |
| JP | A 8-173770 | 7/1996 | |
| JP | A-2000-202342 | 7/2000 | |

* cited by examiner

PROCESSING METHOD UTILIZING DISPLAY INFORMATION FOR CARRYING A CELL STRUCTURE WITH A CATALYTIC COMPONENT

TECHNICAL FIELD

The present invention relates to a processing method for carrying an appropriate amount of a catalytic component on a cell structure. The present invention can be applied to a catalyst carrier or a filter for use in purifying or deodorizing an exhaust gas of an internal combustion engine, or to a catalyst carrier or a filter for use in a chemical reaction instrument taking advantage of catalytic action such as a reformer of a fuel cell or the like.

BACKGROUND ART

As an assembly employed for use in a catalytic converter, a filter, a heat exchanger or the like used for purifying the exhaust gas from an internal combustion engine or used for a chemical reaction instrument taking advantage of catalytic action, there have been known articles in which cell structures are held by and housed in metallic containers (canning) by interposing a compressive material having a cushioning property between the cell structure and the metallic container (a can body) and thereby giving a prescribed compressive contact stress to the cell structure through the compressive material.

For example, in the case where such an assembly is used as a catalytic converter for use in purifying automobile exhaust gas, a ceramic honeycomb structure, a type of cell structure, in which noble metals such as platinum, palladium, rhodium, or the like are dispersed and carried as catalytic components, is held by and housed in a metallic container (a can body) through the intermediary of a ceramic mat or the like, and is mounted in an exhaust system.

As in the above-described catalytic converter, in the case where a catalytic component is carried in the cell structure, an appropriate amount to be carried varies, depending on the masses of the cell structures. Conventionally, the masses of the cell structures are measured beforehand and the cell structures are sorted into several classes based on mass, and the amount of the carried catalytic component (the mass of the catalytic component) is adjusted so as to become the fixed value by controlling the masses after the catalytic component has been carried based on each class of the mass. However, since the masses of the cell structures have a certain variation even within the same class of the mass range, actually some variance exists in the carried amount of the catalytic component if it is examined at the individual cell structures.

The present invention has been completed, in view of the above described problems in the prior art, and the object thereof is to provide a processing method for carrying a catalytic component on each cell with an appropriate amount thereof in accordance with the mass of the cell structure, at the time when the processing for carrying a catalyst component on the cell structure is done, even if there is a variation in the mass of the cell structure.

DISCLOSURE OF THE INVENTION

According to the present invention, there is provided a processing method (a first invention) for carrying a catalytic component on a cell structure, characterized by displaying information about a mass of a cell structure on the surface thereof prior to the initiation of carrying process, reading the information and carrying the cell structure with an appropriate amount of a catalytic component on the basis of the information in the carrying process.

Additionally, according to the present invention, there is provided a processing method (a second invention) for carrying a cell structure having been housed in and held by a metallic container via a compressive material having a cushioning property with a catalytic component, characterized by displaying information about a mass of a cell structure on the surface thereof prior to the initiation of carrying process, reading the information and carrying the cell structure with an appropriate amount of a catalytic component on the basis of the information in the carrying process.

Furthermore, according to the present invention, there is provided a cell structure (a third invention) processed according to any of the above described processing methods.

Yet furthermore, according to the present invention, there is provided a cell structure (a fourth invention), having the above described information displayed thereon, which is processed according to any of the above described processing methods.

BEST MODE FOR CARRYING OUT THE INVENTION

Figure 1A:
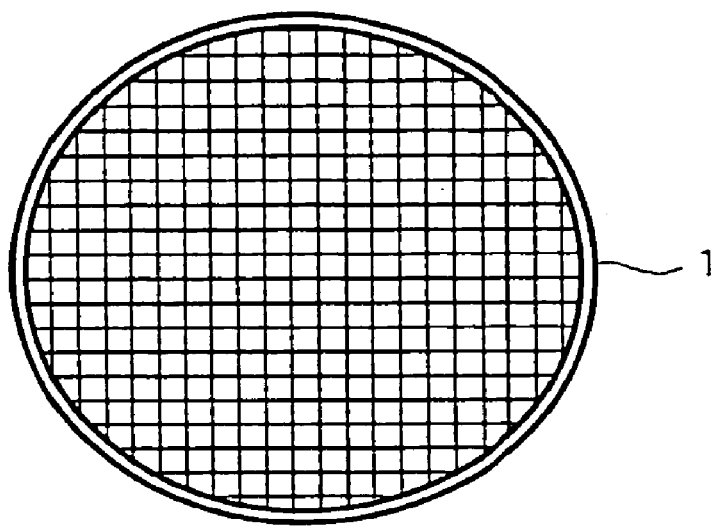
FIGS. 1(a) and (b) are illustrative views of a honeycomb structure used as a cell structure in an embodiment, FIG. 1(a) being a plane view and FIG. 1(b) an oblique perspective view.

As described above, a first invention as a processing method for carrying a catalytic component on a cell structure is characterized by displaying information about mass of a cell structure on the surface thereof prior to the initiation of the carrying process, reading the information, and carrying the cell structure with an appropriate amount of the catalytic component on the basis of the information, in the carrying process.

By controlling the carried amount of the catalytic component on the basis of the information about the mass of the cell structure displayed on the surface of the cell structure, an appropriate amount of the catalytic component may be carried in accordance with the actual mass of the cell structure, and consequently carrying an excess amount of catalytic component can be avoided and the catalytic component amount can be saved.

In the first invention, characters and barcodes may be used for in the manner for displaying the information. Additionally, the information may be displayed by ink coating, a laser, sand blast, chemical corrosion, or the like. When the information is displayed by ink, it is preferable to use an ink jet method or a thermal transcription method.

As a cell structure, there is preferably used a honeycomb structure having a plurality of cell passages defined by a plurality of partition walls, the thickness of cell partition wall of 0.11 mm or less and the opening ratio of 85% or more. Furthermore, as the honeycomb structure, it is preferable that the structure has an outer wall forming an outer diameter contour around the structure, with the thickness of the outer wall being at least 0.05 mm. Incidentally, the cell structures used in the present invention may include a foamed structure, in addition to the honeycomb structures as described above.

It is preferable that the cell structure is made of a ceramic material or a compound comprising two or more ceramic materials selected from the group consisting of cordierite, alumina, mullite, lithium aluminum silicate, aluminum titanate, titania, zirconia, silicon nitride, aluminum nitride, and silicon carbide. Additionally, there can be suitably used a cell structure which is made of one adsorptive material selected from the group consisting of activated charcoal, silica gel, and zeolite.

Incidentally, the cell shape of a honeycomb structure produced by extrusion includes a trigon, a tetragon, a hexagon, a circle, or the like; in general, there are frequently used honeycomb structures having cells each shaped in a square, namely in a tetragon, but recently there have been increasingly used the honeycomb structures having hexagonal cells.

In the case where a cell structure is used as a catalytic converter, it is necessary to carry the cell structure with a catalytic component, and the cell structure is housed in and held by a metallic container usually after the cell structure has been carried with the catalytic component; however, as in the following second invention, the cell structure may be made to carry thereon the catalytic component after the cell structure has been housed in and held by the metallic container.

The second invention is characterized by carrying a cell structure having been held by and housed in a metallic container through a compressive material having a cushioning property with a catalytic component, in the processing method for carrying the cell structure with the catalytic component, displaying information about the mass of the cell structure on the surface of the metallic container prior to the initiation of the carrying process, reading the information and carrying the cell structure with an appropriate amount of the catalytic component on the basis of the information, in the carrying process.

In the other words, the second invention controls the carried amount of the catalytic component based on the information about the mass of the cell structure, similarly to the first invention; however, the catalytic component is carried after the cell structure has been housed in and held by the metallic container, and accordingly the information display position is located on the metallic container surface but not on the cell structure surface which is made hidden in the metallic container. The action effect attained in the second invention is similar to the effect attained in the above described first invention.

Incidentally, in the first and second inventions, there can be used the display manners and display measures similar to those in the above described first invention.

A third invention is the cell structure processed according to the method related to the above described first or second invention, which is made to carry an appropriate amount of a catalytic component as described above, and accordingly can be suitably employed for use in the catalytic converter for purifying the automobile exhaust gas or the like. Additionally, a fourth invention is the cell structure before processing which is to be processed according to the method related to the above described first invention and has the information displayed thereon; the information is displayed thereon beforehand through the above described various manners and measures, and the processing method of the first invention is realized on the basis of the information. The suitable structures, materials or the like for the cell structure are as described above.

EXAMPLES

Figure 1B:
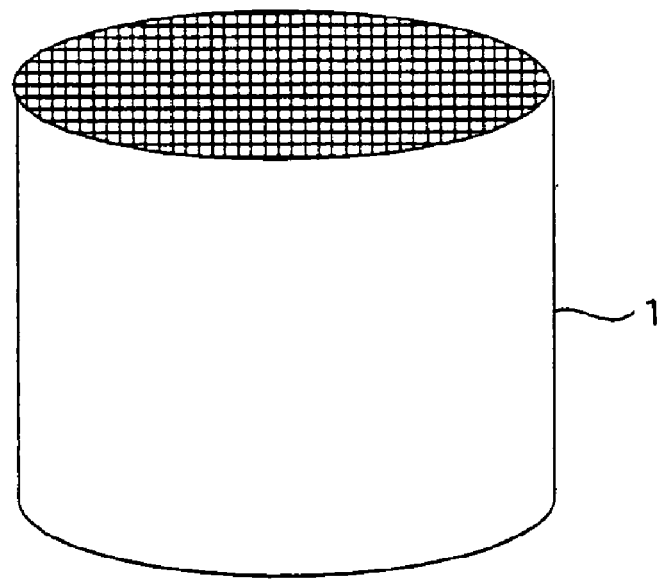

Further detailed description will be made below on the present invention, with reference to an example of the case in which a catalytic converter is produced by use of a honeycomb structure 1 as shown in FIG. 1(*a*) and (*b*) as the cell structure; however, the present invention is not limited to these examples.

As for the methods of making the information such as characters and barcodes be displayed on a honeycomb structure, the method based on an ink jet printing device and the method based on a laser device are preferable for the purpose of processing a large number of members, because these methods are fast and of the non-contact type printing. Particularly, a laser based method is more preferable than the ink jet method from the viewpoint of maintenance because it does not need any ink and does not require any pre-processing to be made beforehand.

Figure 2:
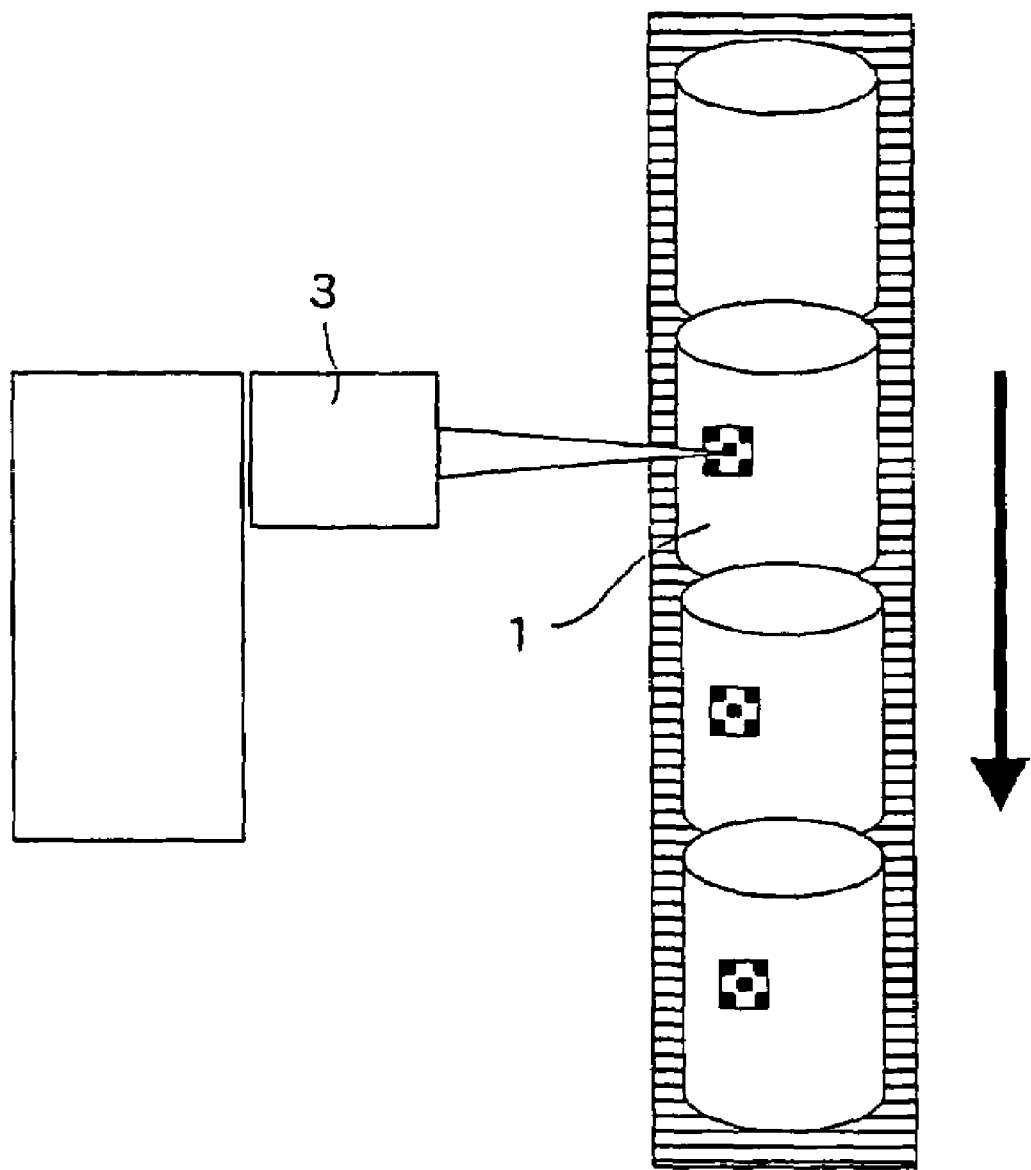
FIG. 2 is a diagram illustrating a method of marking barcodes by means of a laser marker device.

The examination of the mass of a honeycomb structure is performed at the end of the production process of the honeycomb structure, and the information about the mass thereof examined and measured is made to be directly transmitted from the measurement instrument to a laser marker device. As shown in FIG. 2, a honeycomb structure 1 having left the measurement instrument is then delivered to the laser marker device 3 where marking of the barcodes is made on the outer surface of the honeycomb structure 1 on the basis of the information about the mass simultaneously transmitted. A QR code is more preferable because it is small in marking area and accordingly requires a short marking time, and is hardly affected by the outer surface curvature of the honeycomb structure.

An example of the laser marking conditions will be described below. Incidentally, a YAG pulsed laser device or a $CO_2$ (carbon dioxide) gas laser device is suitable as a laser marker device.

Laser marker device:
  A YAG laser marker device (manufactured by Miyachi Technos Corp., lamp excitation type, ML-4141B)
Honeycomb structure:
  A cordierite based honeycomb structure (partition wall: 2 mil; cell density: 900 cpsi; nominal outer diameter φ: 106 mm; length: 114 mm)
Marking conditions:
  Current value: 17A; Q. SW frequency: 8 kHz; scan speed: 150 to 1000 mm/s
Barcode type:
  CODE 39 or QR code; CODE 39 narrow width: 0.38 mm; QR code cell size: 0.508 mm
Information carried by barcodes:
  The mass value actually measured for a honeycomb structure The ceramic honeycomb structure undergoes the barcode marking in the production process under such laser marking conditions as described above, and is then delivered to the process for carrying the catalytic component. Immediately before the catalytic component is carried, the barcodes marked on the ceramic honeycomb structure and the information about the mass thus marked is read by a barcode reader, and is transmitted to a device for carrying a catalyst. The honeycomb structure delivered into the device for carrying a catalyst is carried with the catalytic component after the conditions have been adjusted on the basis of the specific information about the mass.

The honeycomb structure carried with the catalytic component is delivered to a catalyst baking process where it is processed at a temperature of about 600° C. or higher. It is desirable to use an heat-resistant ink when the ink jet method is used, because there is an apprehension that the information displayed on the honeycomb structure will become unreadable or be burned owing to the discoloration of the honeycomb structure in the catalyst carrying process or the catalyst baking process.

In general, owing to masking, the catalytic component is not carried on the outer surface of the honeycomb structure, and accordingly the marked inscription such as the barcodes or the like does not come to be buried by the catalytic component, but some discoloration cannot be avoided; accordingly, it is necessary to specify the marking conditions for the barcodes or the like so that the marked inscription may be read. In the case of the laser marking, the member surface is decomposed and removed in a very shallow region, so that the honeycomb structure carried with the catalytic component by passing through the process for carrying it with the catalytic component is then delivered to the canning process.

The character information can be printed similarly to the barcodes by the ink jet method or the laser marking method. In this case, the printed character information is recorded by a CCD camera and recognized by a pattern matching method. This method is a method in which the characters are registered beforehand, and the patterns closest to the registered characters are selected from the dark and light information of the recorded characters. The present inventors made the numerical character information about the mass displayed by the above laser marking method be read on a F350 image recognition device manufactured by Omron Corp., and confirmed that the information was able to be transmitted without fail.

The reading principle of a barcode reader is that a laser light beam is irradiated on a barcode label and the diffuse reflection light therefrom is received by the light receiver in the barcode reader. In the diffuse reflection light, weak and strong intensities are generated by the reflectivity differences between the spaces and the bars, and such intensities are converted to the ON/OFF digital signals so that the spaces and bars are discriminated and read. Accordingly, in the case where even with the barcodes the weak and strong intensity differences (PCS) come to be small in the diffuse reflection light, reading on a barcode reader becomes difficult, and hence the above described image recognition processing method becomes effective.

Additionally, a method is possible in which the honeycomb structure is held in a metallic container before the catalytic component is carried, and then the honeycomb structure is made to carry the catalytic component. According to this method, it is possible to avoid the trouble that the honeycomb structure is chipped or broken during the process for carrying the catalytic component. In this case, the masses of the compressive material and the metallic container are added to the mass of the honeycomb structure, and hence the total mass as an assembly becomes very heavier as compared to that of the honeycomb structure; thus, for the purpose of controlling the carried amount of the catalyst, the controlling becomes very difficult because the mass distributions both of the compressive material and of the metallic containers are added in addition to the mass distribution of the honeycomb structures. Accordingly, the control of the carried amount of the catalytic component becomes easy by adopting a way in which the information about the mass of the honeycomb structure is displayed on the outer surface of the metallic container, and the catalytic component is made to be carried on the basis of such information about the mass.

INDUSTRIAL APPLICABILITY

As described above, according to the present invention, when a process is performed in which the cell structures are made to carry the catalytic component, the appropriate amount of the catalytic component in conformity with the mass of each cell structure can be carried even if the masses of the cell structures are distributed.

The invention claimed is:

1. A processing method in which a cell structure is carried with a catalytic component, characterized by comprising:
    a step of measuring a mass of the individual cell structure;
    a step of housing the cell structure in a container;
    a step of displaying information identifying an actually measured mass value of the cell structure on the surface of the container;
    a step of reading said information prior to carrying of a catalyst;
    a step of determining the catalytic component amount to be carried on the basis of said read information; and
    a step of carrying said cell structure with the determined amount of the catalytic component.

2. The processing method according to claim 1, in which characters are used for making said information be displayed on the cell structure.

3. The processing method according to claim 2, in which an ink is used for making said information be displayed on the cell structure.

4. The processing method according claim 3, in which the method using an ink for making said information be displayed on the cell structure is a method using ink jet or a method using thermal transcription.

5. The processing method according to claim 2, in which a laser is used for making said information be displayed on the cell structure.

6. The processing method according to claim 2, in which sand blast is used for making said information be displayed on the cell structure.

7. The processing method according to claim 2, in which a chemical corrosion is used for making said information be displayed on the cell structure.

8. The processing method according to claim 1, in which the cell structure is a cell structure housed in and held by the container through a compressive material having a cushioning property.

9. The processing method according to claim 8, in which the container is a metallic container.

10. The processing method according to claim 1, in which barcodes are used for making said information be displayed on the cell structure.

* * * * *